May 20, 1924.
R. B. MURPHY
ANIMAL TRAP
Filed June 22, 1923
1,495,096
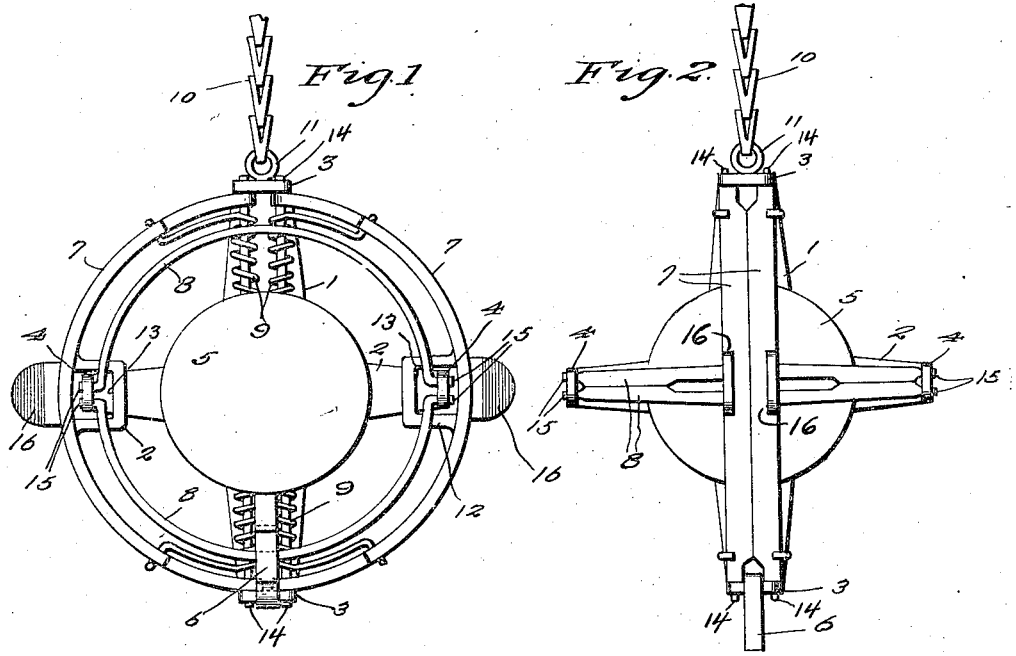
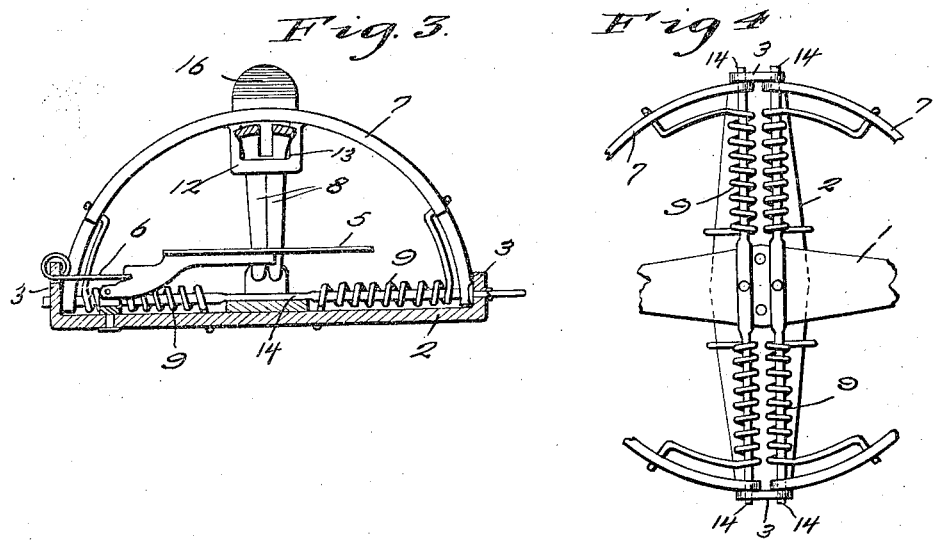
R. B. Murphy, INVENTOR
BY Victor J. Evans, ATTORNEY
WITNESSES Patented May 20, 1924.

1,495,096

UNITED STATES PATENT OFFICE.

ROLLY BUCK MURPHY, OF ELDORADO, ARKANSAS.

ANIMAL TRAP.

Application filed June 22, 1923. Serial No. 647,184.

*To all whom it may concern:*

Be it known that I, ROLLY BUCK MURPHY, a citizen of the United States, residing at Eldorado, in the county of Union and State of Arkansas, have invented new and useful Improvements in Animal Traps, of which the following is a specification.

The object of my said invention is the provision of an animal trap adapted to hold the leg of a caught animal more securely than the traps extant, this with a view to averting the animal escaping by cutting off the portion of its leg below the jaws and pulling the stump or the flesh and skin at the end thereof through and out of engagement with the jaws.

To the attainment of the foregoing the invention consists in a trap comprising two sets of jaws, the jaws of each set being adapted to engage the leg of an animal at right angles to the jaws of the other set so as to preclude the escape of the animal even if it cuts away the portion of the caught leg below the jaws.

The invention also consists in the improved trap as a whole, as hereinafter described and definitely claimed.

In the accompanying drawings, forming part of this specification:—

Figure 1 is a plan view illustrating the trap constituting the preferred embodiment of my invention as the same appears when set.

Figure 2 is a plan view showing the trap as it appears after it is sprung.

Figure 3 is a diametrical section of the spring trap in sprung state.

Figure 4 is a broken plan view of the set trap with the pan removed and the jaws 8 omitted.

Similar numerals of reference designate corresponding parts in all of the views of the drawings.

Among other elements my novel trap comprises two plates 1 and 2 arranged at right angles to each other and appropriately fixed with respect to each other, the plate 1 being larger than the plate 2 in about the proportion illustrated, and both plates having upturned end portions with apertures therein, the said end portions of the plate 1 being numbered 3, and those of the plate 2 being numbered 4. The trap also comprises a pan 5 to support bait, and a trigger 6, the said pan and trigger being preferably, though not necessarily, constructed and relatively arranged as illustrated. The trap further comprises outer jaws 7 and inner jaws 8 together with spring means 9, and an anchor chain 10, the latter being connected through the medium of a swivel 11 to one of the end portions 3 of the plate 1.

My invention resides chiefly in the provision of the two sets of jaws 7 and 8, and by particular reference to Figure 1 it will be noted that the jaws 7 are provided with intermediate enlargements 12 in which are apertures 13, and are pivotally mounted on bars 14 arranged in the plate portions 3. The comparatively small jaws 8 are provided with terminal journals 15 disposed and adapted to turn about their axes in the portions 4 of the plate 2, and it will also be noted that one of the jaws 8 is arranged to be engaged and held in set position by the trigger 6. When the trap is set as illustrated the jaws 8 rest above the intermediate portions of the jaws 7 and thereby hold the jaws 7 down in set position as appears in Figure 1. When, however, the trap is sprung through the medium of the pan 5 and trigger 6 releasing the jaw 8 retained by the trigger, the spring means 9 which may comprise any appropriate number of springs will operate to powerfully close the jaws 8 and the jaws 7, in the order named, the apertured portions 12 of the jaws 7 travelling to closed position on the arcuate portions of the jaws 8.

As shown the spring means includes four coiled springs on the bars 14, said bars 14 being fixed to the plate 1. Each of said springs has one of its terminals disposed under the plate 2 and its other terminal arranged under one of the jaws 7, Figures 3 and 4.

Manifestly in virtue of my novel trap embodying the two pairs of jaws arranged to act at right angles to each other it will be observed that the leg of a caught animal will be engaged at four sides by the jaws, with the releasing advantage hereinbefore definitely pointed out. It will also be observed that the enlarged intermediate portions 12 of the jaws 7 will engage the leg of a caught animal through a considerable length thereof and in that way will contribute to the strength and security by which the animal is held. At 16 on the jaws 7 are portions which afford efficient thumb holds for use in setting the trap, and in this connection I would have it understood that in the preferred embodiment of my invention the outermost parts of the said portions 12 are ribbed or knurled as shown to prevent slipping of the thumbs.

Notwithstanding the practical advantage ascribed to my novel trap, it will be apparent that the trap is simple and inexpensive in construction, is adapted to be set with facility and is well adapted as a whole to withstand the treatment to which traps for coon, mink, otter, muskrat and other animals are ordinarily subjected.

I have entered into a detail description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. An animal trap comprising plates arranged at right angles to each other and having apertured upstanding end portions, a pan, a trigger, spring means, and two pairs of jaws, the jaws of each pair movable at right angles to each other and pivotally connected with said upturned plate portions and one pair of jaws having arcuate portions, and one jaw of one pair being arranged to be engaged and detachably held by the trigger, and the jaws of the other pair being provided with apertured intermediate portions adapted when the trap is sprung to travel to closed position on the arcuate portions of the jaws of the other pair.

2. An animal trap comprising plates arranged at right angles to each other and having apertured upstanding end portions, a pan, a trigger, spring means, and two pairs of jaws, the jaws of each pair movable at right angles to each other and pivotally connected with said upturned plate portions and one pair of jaws having arcuate portions, and one jaw of one pair being arranged to be engaged and detachably held by the trigger, and the jaws of the other pair being provided with thumb holds and also with apertured intermediate portions adapted when the trap is sprung to travel to closed position on the arcuate portions of the jaws of the other pair.

3. An animal trap comprising two pairs of jaws, means on the jaws of one pair for closing the jaws of the other pair on movement of the first-named pair, means for powerfully moving the first-named pair of jaws, and means detachably engaging one of the jaws to hold all of the jaws in set position.

4. An animal trap comprising two pairs of jaws, the jaws of one pair being provided with arcuate portions, means detachably engaging one of the jaws to hold all of the jaws in set position and means for powerfully moving all of the jaws to closed position when the engaged jaw is released; the jaws of each pair being movable to closed position at right angles to the jaws of the other pair, and the jaws of one pair having apertured intermediate portions movable to closed position on the arcuate portions of the jaws of the other pair.

ROLLY BUCK MURPHY.